Sept. 29, 1953 E. SANDMAN ET AL 2,653,425
METHOD OF MAKING BUFFS
Filed April 24, 1951 4 Sheets-Sheet 1

INVENTORS
ELI SANDMAN
ERNEST R. SYKES
BY
*Chas. R. Fay*
ATTORNEY

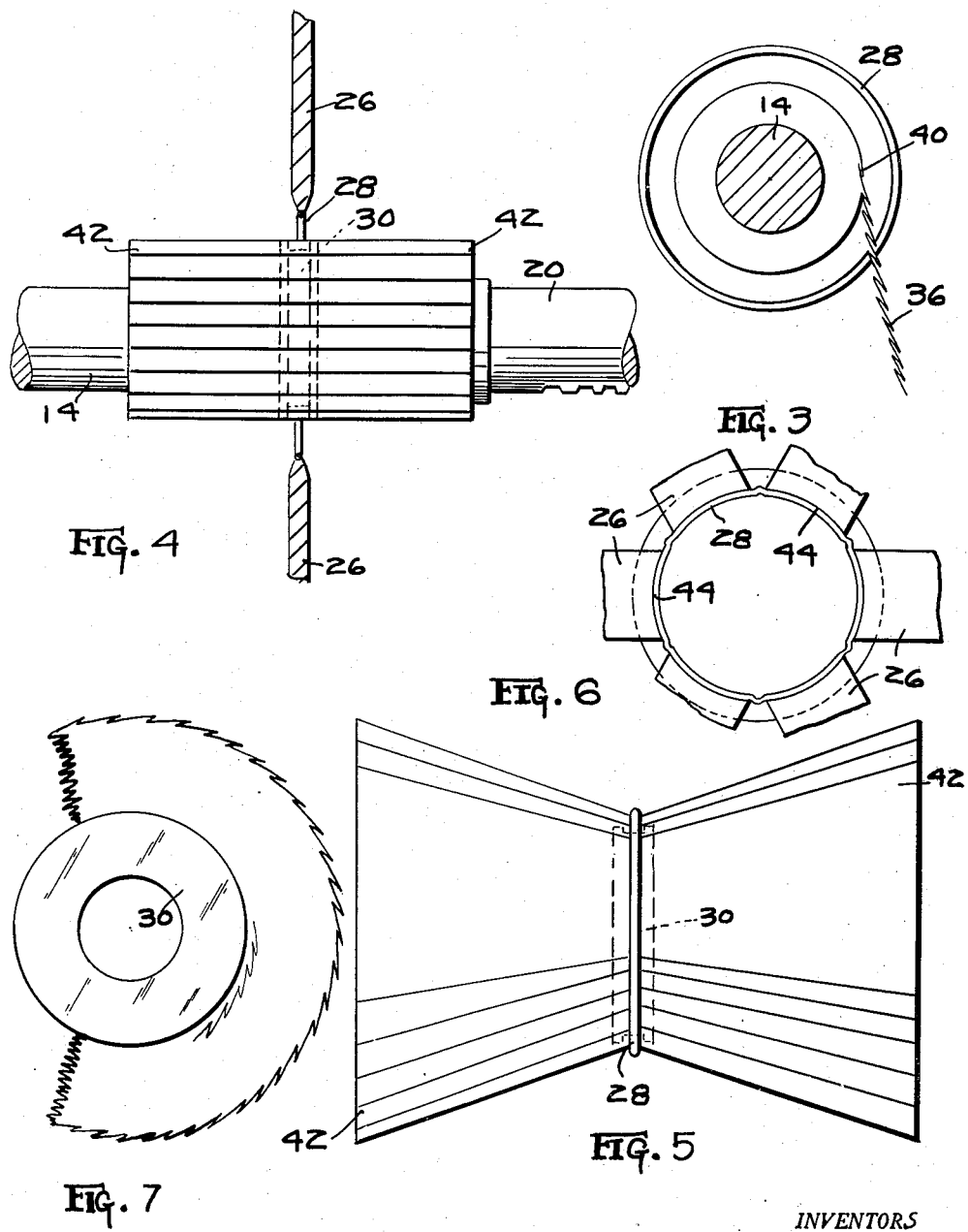

Sept. 29, 1953   E. SANDMAN ET AL   2,653,425
METHOD OF MAKING BUFFS

Filed April 24, 1951   4 Sheets-Sheet 3

INVENTORS
ELI SANDMAN
ERNEST R. SYKES
BY
Chas. R. Fay,
ATTORNEY

Sept. 29, 1953     E. SANDMAN ET AL     2,653,425
METHOD OF MAKING BUFFS

Filed April 24, 1951     4 Sheets-Sheet 4

INVENTORS
ELI SANDMAN
ERNEST R. SYKES
BY

Patented Sept. 29, 1953

2,653,425

UNITED STATES PATENT OFFICE 2,653,425

METHOD OF MAKING BUFFS

Eli Sandman, Worcester, and Ernest R. Sykes, Paxton, Mass., assignors to Eli Sandman Co., Worcester, Mass., a corporation of Massachusetts Application April 24, 1951, Serial No. 222,628

6 Claims. (Cl. 51—193)

This invention relates to a new and improved method for the manufacture of buffs and similar polishing and cutting wheels made of fabrics.

The principal object of the invention resides in the provision of a method for manufacturing buffs faster and with less manual work, while at the same time actually improving the buffs and providing the industry with an improved polishing and cloth wheel cutting means.

The present method comprises the steps of cutting an elongated piece of fabric on the bias so that the threads extend at an angle to the edges thereof, pleating the elongated fabric strip with the pleats running transversely thereof and on the bias relative to the cloth, providing a pair of rotatable relatively movable heads which clamp a hub for the buff therebetween, this hub having a central circumferential groove and the heads being provided with means for gripping the leading edge of the elongated strip thereto with the hub located centrally thereof; whereupon the heads being rotated, the pleated strip is wrapped upon the hub, forming a cylinder about the hub which is located interiorly thereof; thereafter moving a wire ring axially over the now cylindrically arranged pleated strip of cloth and crimping the same down thereonto inwardly radially thereof, the wire extending within the hub groove to an extent which causes the ends of the cylindrical wrapped cloth to flare outwardly into a position where said ends may be laterally flattened and brought around so that the cloth is folded upon itself over the wire ring to form a disk with the pleated ends of the formerly cylindrically arranged strip now extending outwardly with the pleats lying radially of the hub.

A further object of the invention resides in the provision of a new and improved method for reducing the manual labor required in making buffs and increasing the production thereof.

Other objects and advantages of the invention will appear hereinafter.

Reference is to be had to the accompanying drawings in which

Fig. 3 is an end view of the parts shown in Fig. 2, part being in section;

Fig. 4 illustrates the re-positioning of the wire ring relative to the cylindrically wrapped fabric;

Fig. 5 shows the fabric flared out by the crimping of the wire ring;

Fig. 6 illustrates the wire ring crimped, and means for accomplishing the same;

Fig. 7 is an end view of the product shown in Fig. 5;

Figure 1:
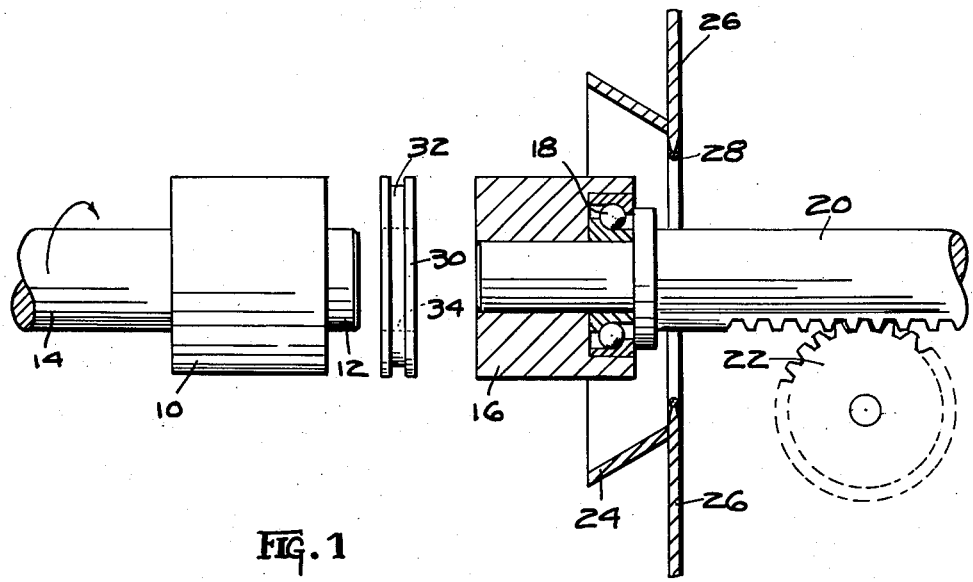
Fig. 1 is a view illustrating the first step in the manufacture of the buff, parts being in section.
Figure 2:
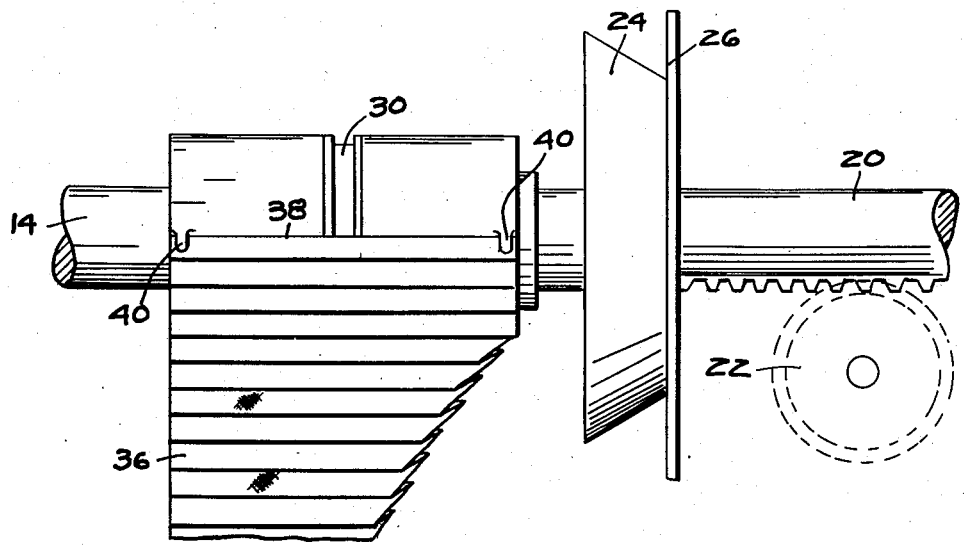
Fig. 2 illustrates the hub clamped and the pleated cloth clipped to the hub clamping heads.

In carrying out the present invention, there is provided a rotary head generally indicated at 10, the same having a central lateral projection 12, the head 10 being mounted on a shaft 14 which may have convenient selectively operated means for rotating it in the direction of the arrow, Fig. 1.

A rotary head 16 mounted on bearings 18 is similar in diameter to head 10 and is mounted on a rod 20 axially movable by means of gear or the like 22 toward or away from the head 10.

A funnel 24 is provided with crimping members 26 which are adapted to laterally inwardly crimp a wire hoop or ring 28 as will appear more fully hereinafter. The funnel and associated parts are slidably mounted by means not shown.

A hub generally indicated at 30 and having a central circumferential groove 32 as well as a center hole 34, is placed on projection 12 and the head 16 is moved to the left in Fig. 1 clamping the hub 30 between the two heads 10 and 16. The heads are then rotatable by means of shaft 14, rotating the hub therewith.

Cloth of suitable nature is cut into long strips on the bias and these long strips are pleated transversely so that the pleats are on the bias relative to the weave of the cloth. The long pleated strip indicated at 36 is detachably secured as by its leading edge 38 into a pair of clips 40, one on each head 10 and 16 respectively, so that upon shaft 14 being rotated, the elongated strip 36 is wound upon the hub 30 a plurality of times, forming a cylinder thereabout with the hub 30 located interiorly thereof at the center, see particularly Fig. 4.

At this stage of the operation, the funnel is moved toward the left in Fig. 1 over the wrapped around strip of fabric, any suitable sliding support being arranged for the funnel and the crimpers 26 for this purpose. When the crimpers 26 have reached a central position relative to the hub 30, the device is stopped and crimpers 26 are moved radially inwardly to deform the wire hub or ring as shown in Fig. 6, to tightly engage the exterior of the cloth cylinder and extend somewhat into the groove 32 insofar as may be allowed by the cloth layers. In this respect, see Fig. 9. The funnel 24 is used because the ends 42 of the pleated cylindrically arranged fabric strip are not exactly square due to the nature of the fabric, and the end over which the funnel slides must be gathered a little bit in order to slide within the circle formed by the inner ends of the crimpers at 44.

Figure 9:
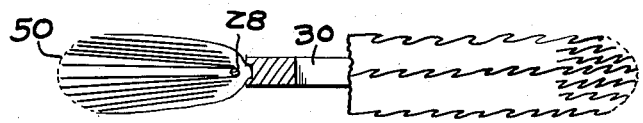
Fig. 9 is a section therethrough.
Figure 8:
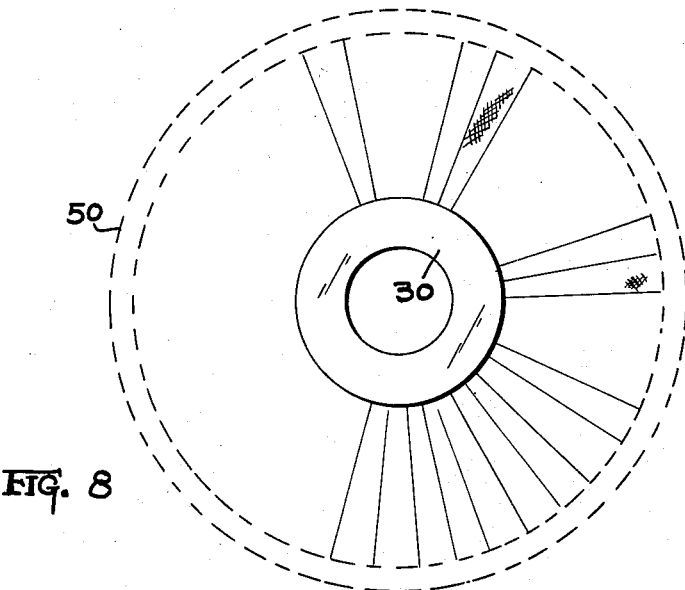
Fig. 8 is a view in elevation of the buff after being flattened out.
Figure 10:
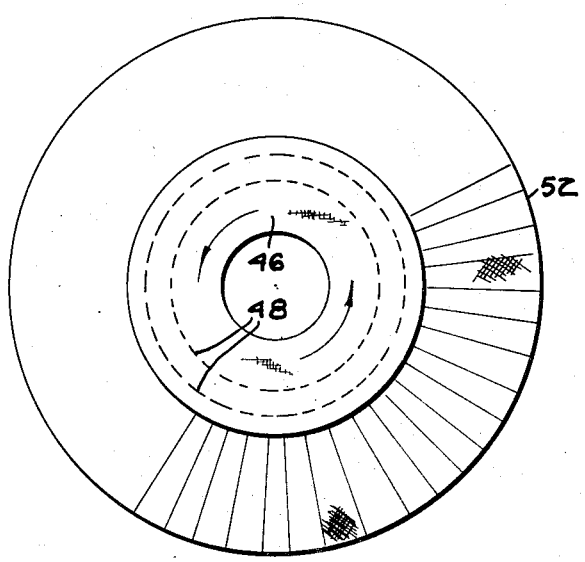
Fig. 10 is a view in elevation of the completed buff.

The crimping step causes the pleated cloth cylinder to flare out at its ends, see Fig. 5 due to the wire ring being brought down into the groove of the hub about the fabric, and this allows the thus hub-bound pleated cloth to be placed on an end and flattened out into the condition shown in Figs. 8 and 9. After this step in the operation, cloth sides 46 are applied to cover the hub and stitching 48 is employed to complete the structural characteristics of the buff. Thereafter, however, the edges at 50 may be trimmed off so as to provide a flat edged buff, see 52 in Fig. 11.

Figure 11:
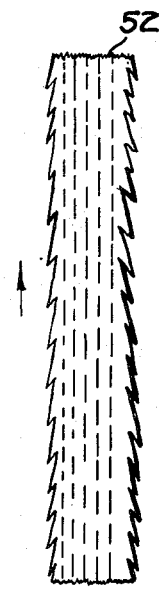
Fig. 11 is an edge view thereof.

The above described method describes a buff which is unidirectional in the direction of the arrow in Fig. 11, having pleats with trailing edges at the sides of the buff. These pleats provide a series of pockets for containing cutting and polishing compounds and it is pointed out that the steps in the method result in the fabrication of the buff which is disclosed in Figs. 8–11 inclusive, and having desirable characteristics that it is cut on the bias, it is unidirectional for better cutting and retention of polishing materials, and it is provided with trailing edges which tend to compress the plies of the buff instead of tending to open out the plies as would be the case were the buff reversed as to direction, cooling the buff and providing better cutting action. At the same time, the improved buff is made with a minimum of manual labor and production is made relatively high.

Figure 12:
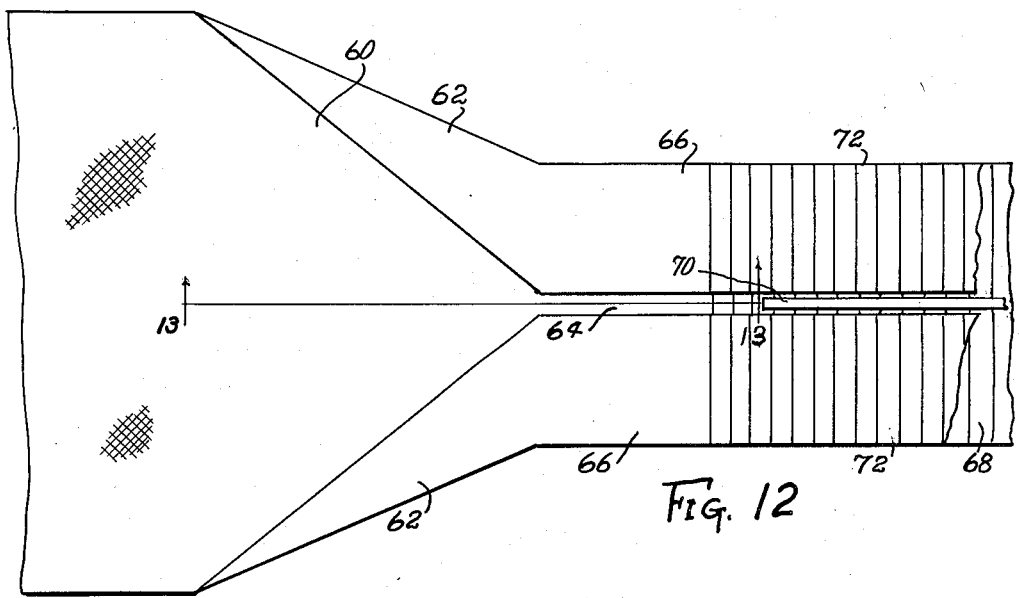
Fig. 12 shows the folding and pleating step of forming a modified buff.
Figure 13:
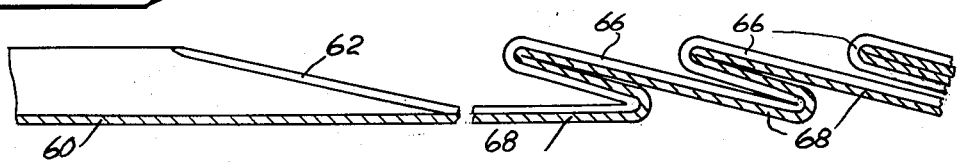
Fig. 13 is an enlarged section on line 13—13.

The modified buff comprises the same wire and the steps of pleating and wrapping about heads 10 and 16, but a wider bias fabric starts the method of making the buff, and this fabric is shown at 60, Fig. 12. The edges of this fabric are infolded at 62 and fail to touch, leaving a central longitudinal gap 64. The flaps folded in are indicated at 66, and these are interpleated with the remaining flat unfolded fabric, see Fig. 13 at 68. The numeral 68 represents the fabric 60 at the center pleated but not folded.

By interpleating in this manner, the pleats are difficult to separate, especially after application of the binder strip 70. Of course, the edges at 72 are folded, not cut at this stage.

The folded, interpleated strip of bias fabric is now wrapped on heads 10 and 16 as before, but if four wraps were made previously, for one buff, but three wraps are made under the modification, as a preferred form. The ring 28 is applied, the plies of fabric flattened out, sewed, etc., just as previously described, and the resultant buff is improved by having more plies, each original ply being now doubled, but no more fabric being held under the wire ring. The periphery of the buff is cut circularly to provide two cut edges for each fold 72.

Figures 14, 15:
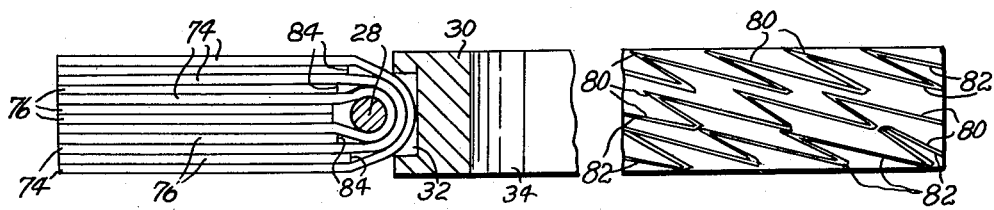
Fig. 14 is a section through a part of the modified buff.
Fig. 15 is a partial edge view thereof.

Referring to Fig. 14, the numerals 74 indicate original wraps, and 76 indicates the doubled plies due to folds or flaps 66. The buff is stiffer, stronger, faster cutting and holds more compound. The new buff provides fifty per cent more cutting surface with for instance three wraps of material than is possible with four wraps of a buff such as the one disclosed in copending application Serial No. 124,052, filed October 28, 1949.

Fig. 15 shows a conventionalized view of one half of a three ply buff, the edge at 78 being flat due to the cut at the periphery. The lines 80 represent cut edges of flaps 66 or members 76 of Fig. 14, and lines 82, interpleated therewith, represent the unfolded cloth as at 68 and members 74 of Fig. 14. The latter, only, are located under the wire 28 and the gap 64 has edges represented at 84 in Fig. 14.

Having thus described our invention and the advantages thereof, we do not wish to be limited to the details herein disclosed otherwise than as set forth in the claims, but what we claim is:

1. The method of making buffs comprising clamping a hub having a grooved periphery between a pair of axially movable rotary heads, rolling a length of pleated fabric on the combined heads in several layers, with the hub centrally located in the roll and transversely positioned therewithin, positioning a wire hoop over the heads and in the plane of the hub groove, crimping the wire down onto the roll and securing the same to the hub while flaring the ends of the roll, pressing the flared ends of the roll to bring the same into substantial parallelism with the hub, and securing the plies of the pleated fabric in this position.

2. Method of making buffs comprising the steps of cutting an elongated strip of fabric on the bias, pleating the strip transversely thereof, clamping a grooved flat hub between a pair of rotary heads, rolling the pleated strip on the heads to provide a cylinder of pleated fabric about the hub, crimping a wire onto the cylinder circumferentially thereof at the center and into the groove of the hub so the ends of the cylinder flare out, flattening the flared ends into the plane of the hub, and stitching through the fabric about the hub.

3. Method of making buffs comprising the steps of clamping a flat round peripherally grooved hub between a pair of axially movable rotary heads, temporarily securing the leading end of an elongated pleated fabric strip to both heads, rotating the heads to wrap the strip thereon in a series of layers forming a cylinder so as to enclose the hub transversely and centrally of the cylinder, providing a wire ring larger than and about one of the heads, moving the ring axially to lie in the plane of the groove in the hub, squeezing the ring radially inwardly to cause the fabric to grip the hub, and flattening the fabric into the plane of the hub.

4. Method of making buffs comprising the steps of infolding upon itself the longitudinal edges of a strip of fabric, pleating the folded fabric transversely, wrapping the pleated fabric on a hub, and securing the plies of wrapped, pleated fabric to the hub.

5. The method of claim 4 including flattening the wrapped plies into disk form and cutting at the periphery to cut off the folded edges and present cut working edges.

6. Method of making buffs comprising the steps of folding inwardly upon itself the edge portions of a fabric strip while leaving a gap between the now closely adjacent edges of the infolded flaps, pleating the folded strip to interengage pleats of the flaps and unfolded portion of the strip, wrapping the pleated strip into cylindrical form about a hub, applying a band-type fastener about the cylinder at the gap, and flattening the material to fold the same over the fastener into a disk form.

ELI SANDMAN.
     ERNEST R. SYKES.

References Cited in the file of this patent

UNITED STATES PATENTS

| Number | Name | Date |
|---|---|---|
| 533,833 | Webster | Feb. 5, 1895 |
| 1,298,522 | Levett | Mar. 25, 1919 |
| 1,404,620 | Levett | Jan. 24, 1922 |
| 2,004,623 | Yohe | June 11, 1935 |
| 2,034,576 | Hall | Mar. 17, 1936 |
| 2,106,610 | Kreilick et al. | Jan. 25, 1938 |
| 2,130,849 | Kreilick et al. | Sept. 20, 1938 |
| 2,209,089 | Peterson et al. | July 23, 1940 |
| 2,489,193 | Mockiewicz et al. | Nov. 22, 1949 |
| 2,556,044 | Sandman et al. | June 5, 1951 |